United States Patent
Couves et al.

(10) Patent No.: US 11,002,122 B1
(45) Date of Patent: May 11, 2021

(54) OIL RECOVERY METHOD

(71) Applicant: BP Exploration Operating Company Limited, Middlesex (GB)

(72) Inventors: John William Couves, Bourne End (GB); Piotr Krawiec, London (GB); Bilal Rashid, London (GB); Timothy Stephen Totton, Isleworth (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 182 days.

(21) Appl. No.: 16/471,458

(22) PCT Filed: Dec. 8, 2017

(86) PCT No.: PCT/EP2017/081965
§ 371 (c)(1),
(2) Date: Jun. 19, 2019

(87) PCT Pub. No.: WO2018/114381
PCT Pub. Date: Jun. 28, 2018

(30) Foreign Application Priority Data

Dec. 20, 2016 (EP) .................................... 16205497

(51) Int. Cl.
*E21B 43/20* (2006.01)
*C09K 8/584* (2006.01)
*C09K 8/40* (2006.01)

(52) U.S. Cl.
CPC ............... *E21B 43/20* (2013.01); *C09K 8/40* (2013.01); *C09K 8/584* (2013.01)

(58) Field of Classification Search
None
See application file for complete search history.

(56) References Cited

U.S. PATENT DOCUMENTS

| 3,670,818 | A * | 6/1972 | Knight | .................... | E21B 43/20 |
| | | | | | 166/400 |
| 2009/0272528 | A1* | 11/2009 | Voelker | ................. | E21B 49/008 |
| | | | | | 166/250.02 |

(Continued)

FOREIGN PATENT DOCUMENTS

| EP | 2261459 | 12/2010 |
| WO | 2012156495 A1 | 11/2012 |

(Continued)

OTHER PUBLICATIONS

PCT/EP2017/081965 International Search Report and Written Opinion dated Feb. 19, 2018 (500894) (13 p.).

(Continued)

*Primary Examiner* — Andrew Sue-Ako
(74) *Attorney, Agent, or Firm* — Conley Rose, P.C.

(57) ABSTRACT

A method for recovering crude oil from a reservoir including at least one layer of reservoir rock having crude oil and a formation water within the pore space thereof includes injecting into the layer(s) of reservoir rock from an injection well, alternating slugs of an aqueous displacement fluid comprising a concentrated solution of a water-soluble additive in an aqueous solvent and of an aqueous spacer fluid. The number of injected slugs of aqueous displacement fluid, n, is in the range of 15 to 1000 per swept pore volume, PVR, of the layer(s) of reservoir rock. The injected pore volume of each individual slug, $PV_{Slug-i}$, of aqueous displacement fluid is in the range of $10^{-12}$ to $10^{-2}$ of the swept pore volume, PVR, of the layer(s) of reservoir rock. The total injected pore volume of the slugs of aqueous displacement fluid is in the range of $10^{-8}$ to $10^{-1}$ of the swept pore volume, PVR, of the layer(s) of reservoir rock. The injected pore volume of each individual slug of aqueous spacer fluid, $PV_{Spacer-i}$, is in the range of 0.0001 to 0.1000 of the swept pore volume, PVR, of the layer(s) of reservoir rock. The total injected pore volume of the slugs of aqueous spacer fluid is in the range of 0.9000000 to 0.9999999 of the swept pore volume, PVR, of the layer(s) of reservoir rock. The reservoir rock has a dispersivity, α, in the range of 1 to 30% of the interwell distance between the injection well and production well. The amount of additive delivered to the layer(s) of reservoir rock by the plurality of slugs of aqueous displacement fluid is equal to or greater than a predetermined minimum additive quantity (MAQ).

14 Claims, 4 Drawing Sheets

(56) References Cited

U.S. PATENT DOCUMENTS

Figure 1A:
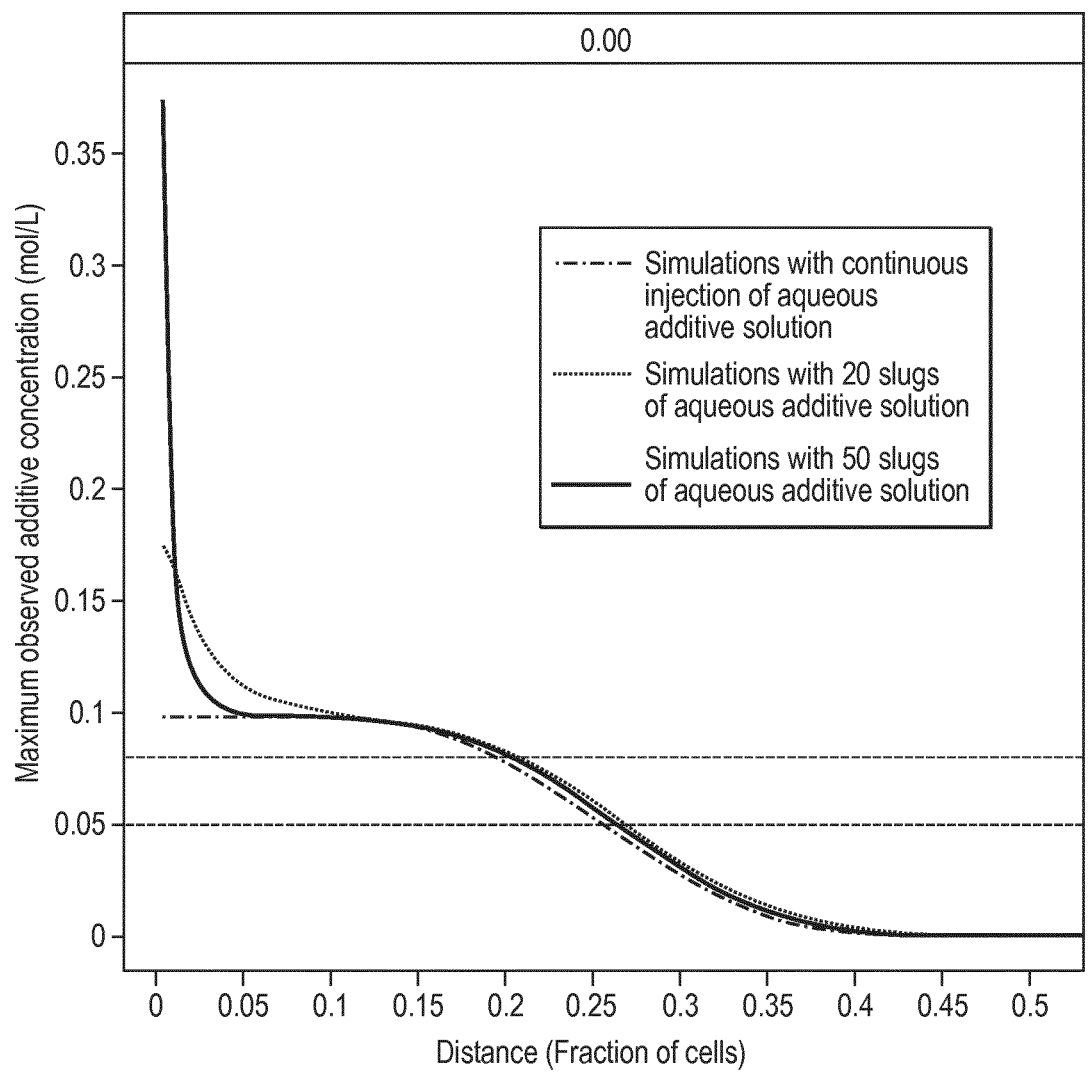

| | | | | |
|---|---|---|---|---|
| 2012/0199343 A1* | 8/2012 | Stehle | ............... | E21B 43/16 |
| | | | | 166/246 |
| 2013/0168089 A1* | 7/2013 | Berg | ............... | C09K 8/588 |
| | | | | 166/270.1 |
| 2014/0069642 A1* | 3/2014 | Frank | ............... | E21B 43/16 |
| | | | | 166/271 |
| 2015/0233223 A1* | 8/2015 | AlAmeri | ............ | E21B 43/20 |
| | | | | 166/305.1 |

FOREIGN PATENT DOCUMENTS

| | | |
|---|---|---|
| WO | 2013117741 A1 | 8/2013 |
| WO | 2015007749 A1 | 1/2015 |
| WO | 2015165734 A1 | 11/2015 |

OTHER PUBLICATIONS

Mohammadi, Hourshad, et al., "Mechanistic Modeling of the Benefit of Combining Polymer with Low Salinity Water for Enhanced Oil Recovery," SPE 153161, Tulsa, Oklahoma, Apr. 14, 2012 (11 p.).

Jerauld, Gary R., et al., "Modeling Low-Salinity Waterflooding," SPE 102239, Reservoir Evaluation & Engineering, Dec. 2008, pp. 1000-1012 (13 p.).

\* cited by examiner

OIL RECOVERY METHOD

CROSS-REFERENCE TO RELATED APPLICATIONS

This application is a 35 U.S.C. § 371 national stage application of PCT/EP2017/081965 filed Dec. 8, 2017 and entitled "Oil Recovery Method," which claims priority to European Application No. 16205497.7 filed Dec. 20, 2016 and entitled "Oil Recovery Method," both of which are hereby incorporated herein by reference in their entirety for all purposes.

STATEMENT REGARDING FEDERALLY SPONSORED RESEARCH OR DEVELOPMENT

Not applicable.

BACKGROUND

The present invention relates to a method for injecting an aqueous solution of a water-soluble chemical additive into a reservoir for recovery of crude oil therefrom.

It has long been known that only a portion of the oil can be recovered from an oil-bearing reservoir as a result of the natural energy of the reservoir. So-called secondary recovery techniques are used to recover additional oil from a reservoir, the simplest method of which is by direct replacement with another medium, usually water or gas.

Optionally an additive may be added to an aqueous medium for enhanced recovery of oil from a reservoir.

SUMMARY

According to the present invention there is provided a method for recovering crude oil from a reservoir comprising at least one layer of reservoir rock having crude oil and a formation water within the pore space thereof wherein the layer(s) of reservoir rock is penetrated by at least one injection well and at least one production well, the method comprising:
injecting into the layer(s) of reservoir rock from the injection well, alternating slugs of an aqueous displacement fluid comprising a solution of a water-soluble additive in an aqueous solvent and of an aqueous spacer fluid characterized in that:
(a) the number of injected slugs of aqueous displacement fluid, n, is in the range of 15 to 1000 per swept pore volume, PVR, of the layer(s) of reservoir rock;
(b) the injected pore volume of each individual slug, $PV_{Slug-i}$, of aqueous displacement fluid is in the range of $10^{-12}$ to $10^{-2}$ of the swept pore volume, PVR, of the layer(s) of reservoir rock:

$$10^{-12} \leq PV_{Slug-i} \leq 10^{-2};$$

(c) the total injected pore volume of the slugs of aqueous displacement fluid is in the range of $10^{-8}$ to $10^{-1}$ of the swept pore volume, PVR, of the layer(s) of reservoir rock:

$$10^{-8} \leq \sum_{i=1}^{n} PV_{Slug-i} \leq 10^{-1};$$

(d) the injected pore volume of each individual slug of aqueous spacer fluid, $PV_{Spacer-i}$, is in the range of 0.0001 to 0.1000 of the swept pore volume, PVR, of the layer(s) of reservoir rock:

$$0.0001 \leq PV_{Spacer-i} \leq 0.1000;$$

(e) the total injected pore volume of the slugs of aqueous spacer fluid is in the range of 0.9000000 to 0.9999999 of the swept pore volume, PVR, of the layer(s) of reservoir rock:

$$0.9000000 \leq \sum_{i=1}^{n} PV_{Spacer-i} \leq 0.9999999;$$

(f) the reservoir rock has a dispersivity, a, in the range of 1 to 30% of the interwell distance between the injection well and production well; and
(g) the amount of additive delivered to the layer(s) of reservoir rock by the plurality of slugs of aqueous displacement fluid is equal to or greater than a predetermined minimum additive quantity (MAQ).

Suitably, the minimum additive quantity, MAQ, delivered to the layer(s) of reservoir rock by injecting the plurality of slugs of aqueous displacement fluid may be determined using Equation 1 below:

$$MAQ \left[ C_{InjAvg} \cdot \left( 4\sqrt{\alpha} \, \text{erf}^{-1} \left\{ \frac{C_r}{C_{InjAvg}} \right\} \right) + RAC \right] \cdot PVR \qquad (1)$$

wherein RAC is the adsorption capacity of the reservoir (hereinafter "Reservoir Adsorption Capacity"), $C_T$ is the threshold concentration for the additive, $C_{InjAvg}$ is the initial average concentration of additive for the injected alternating slugs (i.e., in both the slugs of aqueous spacer fluid and the aqueous spacer slugs), a is the dispersivity of the reservoir and PVR is the swept pore volume of the layer(s) of reservoir rock.

Suitably, $C_{InjAvg}$ is determined using Equation 2 below:

$$C_{InjAvg} = \frac{\sum_{i=1}^{n} (C_{Slug-i} \cdot PV_{Slug-i})}{\sum_{i=1}^{n} (PV_{Slug-i} + PV_{Spacer-i})} \qquad (2)$$

wherein $C_{Slug-i}$ is an initial concentration of additive in an individual slug of aqueous displacement fluid.

The person skilled in the art will understand that, in the method of the present invention, alternating slugs of aqueous displacement fluid and aqueous spacer fluid are injected into the layer(s) of reservoir rock from the injection well and produced fluids comprising oil, water and gas are removed from the production well.

Definitions

"Aqueous drive fluid" is an aqueous fluid that may be injected into an injection well after injection of the final slug of the alternating slugs of aqueous displacement fluid and aqueous spacer fluid.

"Bank of oil" is a term well known to the person skilled in the art and refers to a portion of the layer(s) of reservoir rock where the oil saturation is increased because of the application of an enhanced oil recovery process that targets immobile oil.

"Dispersivity" of a layer of reservoir rock, $\alpha$, is the dispersivity in the direction of flow (also referred to as "longitudinal dispersivity"). Dispersivity is a characteristic property of reservoir rock arising from velocity differences within pores on a microscopic scale and path differences due to the tortuosity of the pore network of the reservoir rock. Dispersivity is related to the dispersion coefficient, D, of a porous medium and the advective flow velocity, v, of a fluid through the reservoir rock as follows:

$$D=\alpha \cdot v$$

wherein $\alpha$ has units of length (typically metres). Dispersivity for a layer of reservoir rock may also be expressed as a dimensionless number. For example, a dimensionless dispersivity may be determined as a percentage of the system length (in particular, as a percentage of the length of a core plug taken from the reservoir rock, or as a percentage of an interwell distance between a pair of injection and production wells that penetrate the layer(s) of reservoir rock). Alternatively, the dimensionless dispersivity may be defined as a percentage of the distance travelled (for example, as a percentage of the distance that an injection fluid has travelled from an injection well to a production well).

In Equation 1, "erf" is an error function.

"Formation water" is the water associated with the reservoir rock, i.e., connate water, any invading aquifer water and any previously injected water.

"Incremental oil production" means an amount of produced oil that is at least 1%, preferably at least 3%, more preferably, at least 5%, in particular, at least 7.5%, for example, at least 10% above that achieved or predicted to be achieved when waterflooding the layer(s) of reservoir rock with the injection water used as the aqueous spacer fluid in the absence of the water-soluble chemical additive.

"Predicted incremental oil production" means an amount of incremental oil determined from coreflood experiments or Single Well Chemical Tracer (SWCT) tests which are techniques well known to the person skilled in the art.

"Hardness cations" means multivalent cations, in particular, divalent cations such as magnesium and calcium cations.

"Initial concentration of additive" is the concentration of additive in the aqueous displacement fluid prior to injection of the slugs of aqueous displacement fluid into the injection well.

"Injection site" is the site at which the alternating slugs of aqueous displacement fluid and aqueous spacer fluid are injected into the injection system of the injection well.

"Injection temperature and pressure" is the temperature and pressure in the injection well adjacent the layer(s) of reservoir rock into which the aqueous displacement fluid is to be injected.

"Swept pore volume (PVR)" is the pore volume of the layer(s) of reservoir rock swept by injected fluids (slugs of aqueous displacement fluid, aqueous spacer slugs and any aqueous drive fluid) between an injection well and production well, averaged over all flow paths between the injection well and production well. Where an injection well has two or more associated production wells, the term "swept pore volume" means the pore volume of the layer(s) of reservoir rock swept by the injected fluids between the injection well and its associated production wells.

The values of pore volumes given for the slugs of aqueous displacement fluid and for the slugs of aqueous spacer fluid are based on the swept pore volume (PVR) of the layer(s) of reservoir rock. The pore volumes refer to the injected pore volumes of the slugs prior to dispersion within the layer(s) of reservoir rock.

$PV_{Slug-i}$ is the pore volume of an individual slug of aqueous displacement fluid.

$PV_{Spacer-i}$ is the pore volume of an individual slug of aqueous spacer fluid.

$C_{InjAvg}$ is the average initial concentration of additive in the alternating slugs of aqueous displacement fluid and of aqueous spacer fluid and typically has units of mg/L or mol/L.

$C_{Slug-i}$ is the initial concentration of additive in an individual slug of aqueous displacement fluid.

$C_{Spacer-i}$ is the initial concentration of additive in an individual slug of aqueous spacer fluid and, for the purpose of determining $C_{InjAvg}$, is taken to be zero. Therefore, $C_{Spacer-i}$ is not included in Equation 2. However, the person skilled in the art would understand that, if the aqueous spacer fluid contains a low concentration of additive. Equation 2 may be expanded to include $C_{Spacer-i}$.

"Threshold concentration, $C_T$, for the additive" is the minimum concentration of an additive in the aqueous displacement fluid predicted to achieve incremental oil production upon continuous injection of one pore volume of aqueous displacement fluid into the reservoir followed by an aqueous drive fluid. Typically, $C_T$ has units of mg/L or mol/L.

"Minimum Additive Quantity (MAQ)" is the minimum amount of additive delivered to the at least one layer of reservoir rock by the slugs of aqueous displacement fluid and typically has units of mass (for example, mg) or mol.

"Reservoir Adsorption Capacity (RAC)" is the amount of additive adsorbed by the reservoir and typically has the units mg/L of accessible pore volume or mol/L of accessible pore volume.

The person skilled in the art would understand that the units for $C_{InjAvg}$, $C_{Slug-i}$, $C_T$, MAQ and RAC should be consistent (based either on mass of additive or moles of additive).

"Travel distance" means the distance travelled by the front of the dissolved additive through the layer(s) of reservoir rock from the injection well towards the production well.

The unit "ppmv" is "parts per million on a volume of water basis" and is equivalent to the unit "mg/L".

DETAILED DESCRIPTION

In the method of the present invention, alternating slugs of the aqueous displacement fluid and of the aqueous spacer fluid are injected into the layer(s) of reservoir rock from the injection well to release oil from the reservoir rock and to produce fluids comprising oil, water and gas from the production well. As discussed in more detail below, there may be more than one injection well and more than one production well.

The water-soluble additive may be any water-soluble chemical additive used in enhanced oil recovery (EOR) such as surfactants; urea and derivatives thereof; ethylenediamine tetraacetic acid (EDTA) and alkali metal salts thereof; alkali metal hydroxides such as sodium and potassium hydroxide; alkali metal carbonates; alkali metal orthosilicates; and, mixtures thereof.

Injection of the alternating slugs may commence with either a slug of aqueous displacement fluid or a slug of aqueous spacer fluid. Similarly, injection of the alternating slugs may terminate with either a slug of aqueous displacement fluid or a slug of aqueous spacer fluid. Generally, an aqueous drive fluid is injected into the layer(s) of reservoir after injecting the final slug of the alternating slugs to sweep the dispersively mixed fluids (and hence the bank of released oil) towards a production well.

The alternating slugs of aqueous displacement fluid and of aqueous spacer fluid are believed to mix within the layer(s) of reservoir rock with the extent of mixing being dependent upon the dispersivity of the reservoir rock and the travel distance of the additive front. Typically, the dispersivity of a layer of reservoir rock is in the range of 1 to 30%, preferably 2 to 15%, more preferably, 2 to 10% of the interwell distance or the travelled length. The dispersivity of the layer(s) of reservoir rock into which the aqueous displacement fluid is to be injected may be determined from dispersivity tests performed on samples of a reservoir rock or may be determined from a single well chemical tracer test performed on a well that penetrates the oil-bearing layer(s) of reservoir rock. When the dispersivity tests are performed on samples of a reservoir rock, the dispersivity tests are typically performed during coreflood experiments.

Suitably, the aqueous displacement fluid is delivered to the injection site as an aqueous concentrate having a concentration of additive of at least 10% by weight, preferably, at least 20% by weight, more preferably, at least 30%, most preferably, at least 40% by weight. The upper limit for the concentration of additive in the concentrate is the saturation concentration of the additive at the ambient conditions encountered at the injection site. Suitably, the solvent for the concentrate is selected from potable water, distilled water or deionized water.

The concentrate may be supplied to the injection site for the reservoir at the desired dissolved additive concentration and may be injected directly into the at least one layer of reservoir rock without further dilution into an injection water. Thus, the concentrate may serve as the aqueous displacement fluid. The pore volume sizes of the plurality of slugs of concentrate in the alternating sequence of slugs may be the same or different. Typically, an injection water, available at the injection site, serves as the aqueous spacer fluid. The pore volume sizes of the plurality of aqueous spacer slugs in the alternating sequence of slugs may be the same or different. Injection of alternating slugs of the concentrate and aqueous spacer fluid may continue until the desired total pore volume of concentrate has been injected into the layer(s) of reservoir rock from the injection well. Following injection of the final slug of concentrate, the injection water may be used as the aqueous drive fluid.

Alternatively, the slugs of aqueous displacement fluid may be formed by diluting the concentrate into an injection water that is available at the injection site for the reservoir. In this case, it is preferred that the same injection water is used as the aqueous spacer fluid such that the concentrate is intermittently dosed into the injection water. Suitably, injection of the injection water may be continued after the final dosing of the concentrate into the injection water such that the injection water serves as an aqueous drive fluid.

Where the concentrate is diluted into the injection water, the amount of concentrate dosed into the injection water may be controlled using a metered pump to maintain the concentration of additive in each slug of aqueous displacement fluid at a near a target concentration, for example within ±1% of a target concentration. The amount of concentrate dosed into the injection water may be same or different for each slug. Further, the sizes of each of the slugs of aqueous displacement fluid (formed by dosing concentrate into the injection fluid) may be the same or different, i.e., the concentrate may be dosed into the same or different volumes of injection water. Similarly, the pore volumes of the aqueous spacer slugs may be the same or different, i.e., the same or different volumes of injection water may be injected after ceasing and before recommencing dosing of concentrate into the injection fluid.

Suitably, the injection water, referred to above, may be selected from saline waters such as seawater, estuarine water, brackish water, saline produced water, saline aquifer water; naturally occurring low salinity waters such as low salinity produced water, low salinity aquifer water, and fresh water (for example, river water or lake water); sulfate reduced saline waters having sulfate anion concentrations of less than 100 ppmv, in particular, less than 40 ppmv; and desalinated saline waters. The injection water may be a soft water. "Soft water" is defined herein as a water having a concentration of hardness cations of less than 150 ppmv, preferably, less than 70 ppmv, more preferably less than 50 ppmv. Where the additive is a surfactant, it is preferred that the injection water is a soft water, in particular, a soft low salinity water thereby mitigating the risk of forming insoluble soaps.

The threshold concentration of additive may be determined from coreflood experiments, single well chemical tracer tests (SWCTT), imbibition studies or from contact angle measurements. The coreflood experiments may be performed either under reduced conditions (at a laboratory temperature and pressure) or under reservoir conditions (at a temperature and pressure representative of reservoir conditions). Typically, the coreflood experiments may be performed on a core plug taken from a core sample removed from the layer(s) of reservoir rock. The core plug is preferably reduced to initial oil saturation using samples of the formation water and crude oil removed from the reservoir, and in the case of a reservoir condition coreflood test, with the fluids recombined with a gas having the same composition as the gas separated from the produced fluids at a production facility. However, a synthetic formation water may also be used, preferably, having the same composition as the formation water sampled from the reservoir. Typically, a secondary coreflood test is performed in which an injection water is injected into the core sample until oil is no longer produced from the core sample followed by a tertiary coreflood test in which an aqueous displacement fluid comprising an aqueous solution of the additive in the injection water is injected into the core sample. The threshold concentration, $C_T$, of additive is the minimum concentration of additive in the aqueous displacement fluid that is injected into the core sample at which incremental oil production is observed in the tertiary coreflood experiment. Such coreflood tests are well known to the person skilled in the art.

The Reservoir Adsorption Capacity (RAC) for the additive may be determined from coreflood experiments by analysis of the concentration of additive in the aqueous phase of the effluent removed from the core sample (compared with a non-adsorbing tracer) or by static adsorption measurements or dynamic adsorption measurements on a sample of reservoir rock (for example, a core sample).

The total pore volume of the plurality of slugs of aqueous displacement fluid that are injected into the layer(s) of reservoir rock is in the range of $10^{-8}$ to $10^{-1}$, preferably, in the range of $10^{-7}$ to $10^{-2}$, more preferably, in the range of $10^{-6}$ to $10^{-2}$, most preferably, in the range of $10^{-5}$ to $10^{-3}$ of the swept pore volume (PVR).

The pore volume of each of the individual slugs of aqueous displacement fluid is in the range of $10^{-12}$ to $10^{-2}$ of the swept pore volume (PVR). Preferably, each individual slug of aqueous displacement fluid has a pore volume in the range of $10^{-19}$ to $10^{-4}$, more preferably, in the range of $10^{-9}$ to $10^{-4}$ of the PVR. It is to be understood that the pore volumes of each of the plurality of slugs of aqueous displacement fluid may be the same or different.

The person skilled in the art will understand that the number of slugs, n, of aqueous displacement fluid will be dependent upon the total injected pore volume of the plurality of slugs of aqueous displacement fluid and the pore volume of each of the plurality of slugs of aqueous displacement fluid. Typically, there may be at least 15 slugs, preferably at least 20 slugs of aqueous displacement fluid per pore volume swept by the injected fluids. Typically, there may be up to 1000 slugs, preferably, up to 500 slugs, more preferably up to 100 slugs, for example, up to 50 slugs of aqueous displacement fluid per pore volume swept by the injected fluids. Suitably, there may be from 15 to 1000 slugs, preferably, 20 to 500 slugs, more preferably from 20 to 250 slugs, for example, from 20 to 100 slugs of aqueous displacement fluid per pore volume swept by the injected fluids. In this context, the term "injected fluids" is taken to comprise the alternating slugs of aqueous displacement fluid and of aqueous spacer fluid and any subsequently injected aqueous drive fluid.

Suitably, the amount of additive delivered to the layer(s) of reservoir rock by the plurality of slugs of aqueous displacement fluid is equal to or greater than the minimum additive quantity (MAQ).

The total pore volume of the plurality of slugs of aqueous spacer fluid that are injected into the layer(s) of reservoir rock is in the range of 0.9 to 0.9999999, preferably, in the range of 0.99 to 0.9999999, more preferably, in the range of 0.99 to 0.999999, most preferably, in the range of 0.999 to 0.99999 (based on the swept pore volume).

Suitably, each individual slug of aqueous spacer fluid has a pore volume in the range of 0.0001 to 0.1000 (based on the swept pore volume). The pore volumes of the individual slugs of aqueous spacer fluid may be the same or different. Suitably, a slug of aqueous spacer fluid may have a higher pore volume than an adjacent slug of aqueous displacement fluid. For example, the ratio of the injected pore volume of an aqueous spacer slug to the injected pore volume of an adjacent slug of aqueous displacement fluid is preferably at least 2:1, most preferably, at least 3:1. Suitably, the ratio of the injected pore volume of a slug of aqueous spacer fluid to the injected pore volume of an adjacent slug of aqueous displacement fluid is in the range of 2:1 to 1000:1, preferably, 3:1 to 500:1. The person skilled in the art will understand that the number of spacer slugs will be dependent upon the number of slugs of aqueous displacement fluid in the alternating sequence of slugs.

It is envisaged that the composition of the aqueous spacer fluid may be the same or different for each spacer slug, preferably, the same. Typically, each individual slug of aqueous spacer fluid either does not contain any additive or has a concentration of additive, $C_{Spacer-i}$, significantly below the threshold concentration, $C_T$, for the additive, for example, $C_{Spacer-i}$ may be less than 25%, preferably, less than 10%, more preferably, less than 5%, in particular, less than 1% of the threshold concentration, $C_T$.

As discussed above, an aqueous drive fluid may be injected into the layer(s) of reservoir rock from the injection well to sweep the dispersively mixed slugs (and hence the bank of released oil) through the layer(s) of reservoir rock towards a production well. Typically, the aqueous drive fluid is injected into the layer(s) of reservoir rock in a pore volume of at least 1, preferably, at least 2, for example, in the range of 2 to 10. Typically, this aqueous drive fluid does not contain any additive or contains an amount of additive significantly below the threshold concentration, $C_T$, for the additive, for example, an amount that is less than 25%, preferably, less than 10%, more preferably, less than 5%, in particular, less than 1% of the threshold concentration $C_T$.

It is envisaged that a slug of aqueous spacer fluid may be injected into the layer(s) of reservoir rock before the first of the slugs of aqueous displacement fluid thereby minimizing mixing of the aqueous displacement fluid with the formation water. However, where the aqueous displacement fluid is compatible with the formation water, there is no requirement to inject a slug of aqueous spacer fluid before the first of the slugs of aqueous displacement fluid.

Similarly, a slug of aqueous spacer fluid may be injected into the layer(s) of reservoir rock after the final slug of aqueous displacement fluid and before injection of the aqueous drive fluid. However, where the aqueous drive fluid is compatible with the aqueous displacement fluid, there is no requirement for a spacer slug between the final slug of aqueous displacement fluid and the aqueous drive fluid.

By "compatible" is meant that mixing of the first slug of aqueous displacement fluid with the formation water (or of the last slug of aqueous displacement fluid with the aqueous drive fluid) does not result in precipitation of either insoluble mineral scales or insoluble species arising from reaction of the additive with any precipitating ions for the additive that may be present in the formation water (or in the aqueous drive fluid).

Precipitation of insoluble mineral scale is to be avoided as this may result in formation damage or in deposition of mineral scales in the production well or in production lines. For example, precipitation of insoluble mineral scales may occur when the formation water contains precipitate precursor cations such as barium or strontium cations and the aqueous displacement fluid contains precipitating multivalent anions such as sulfate anions resulting in the precipitation of insoluble sulfate salts of the precipitate precursor cations such as barium sulfate or strontium sulfate. Precipitation of insoluble mineral scales may also occur when the aqueous displacement fluid contains precipitating multivalent anions such as sulfate anions and the aqueous drive fluid contains precipitate precursor cations such as barium or strontium cations. It is therefore preferred that the aqueous displacement fluid has a low content of such precipitating multivalent anions.

Accordingly, where there is a risk of precipitation of insoluble mineral scale, it is preferred that the injection water (employed as aqueous spacer fluid or as aqueous drive fluid or into which the concentrate is optionally diluted) is selected from:

1. A naturally occurring low salinity water such as river water, lake water, low salinity aquifer water, low salinity produced water (low salinity water separated from oil at a production facility) wherein the naturally occurring low salinity water has a concentration of sulfate anions of less than 100 ppmv, preferably, less than 40 ppmv.
2. A sulfate reduced injection water formed by removing sulfate anions from a naturally occurring saline water such as seawater, estuarine water, produced water (saline produced water separated from oil at a production facility) or saline aquifer water wherein the sulfate reduced injection water has a sulfate concentration of less than 100 ppmv, preferably less than 40 ppmv.

3. A desalinated injection water having a sulfate anion concentration of less than 100 ppmv, preferably, less than 40 ppmv, in particular, less than 25 ppmv.

A sulfate reduced injection water may be produced by contacting a naturally occurring saline water (feed water) having a relatively high sulfate concentration, for example, seawater, estuarine water, or brackish water, with a nanofiltration membrane that selectively excludes sulfate anions whilst allowing monovalent ions such as Group IA metal ions (e.g. sodium ions) and halide ions (e.g. chloride ions and bromide ions) to pass therethrough thereby producing a permeate comprising a sulfate reduced saline water stream (hereinafter NF permeate) having a lower concentration of sulfate anions and a retentate having a higher concentration of sulfate anions than the feed water. Thus, the permeate stream (sulfate reduced saline water) removed from a nanofiltration membrane typically has a sulfate concentration of less than 100 ppmv, preferably less than 40 ppmv, more preferably, less than 25 ppmv. A nanofiltration membrane also selectively removes hardness cations from the feed water such that the permeate stream (sulfate reduced saline water) has a hardness cation concentration of less than, for example, 150 ppmv.

It is also envisaged that a sulfate reduced injection water may be formed by adding precipitating counter-cations, such as barium or strontium cations, to a naturally occurring saline water that contains high levels of sulfate anions thereby forming insoluble sulfate salts of the precipitating cation, such as barium sulfate or strontium sulfate, which may then be separated from the saline water by filtration or centrifugation.

A desalinated injection water may be formed by treating a naturally occurring saline water using reverse osmosis (RO) to generate a treated water (i.e., a permeate that passes through the RO membrane) that is substantially free of sulfate anions and of other dissolved solids. Typically, the permeate that passes through an RO membrane (hereinafter RO permeate) has a total dissolved solids content of less than 500 ppmv, for example, less than 200 ppmv, a sulfate anion concentration below 40 ppmv, preferably below 25 ppmv, and a hardness cation concentration of less than 150 ppmv.

In order to mitigate the risk of formation damage arising from swelling and migration of clays, the RO permeate may be mixed with NF permeate to increase the total dissolved solids content of the desalinated injection water, typically, to a value in the range of 1000 to 5000 ppmv, preferably, to a value in the range of 2000 to 3000 ppmv.

Modelling studies have shown that injection of alternating slugs of aqueous displacement fluid and aqueous spacer fluid into at least one layer of reservoir rock having a dimensionless dispersivity in the range of 1 to 30%, has the effect of exposing the portion of the layer(s) of the reservoir close to the injection well, in particular, the first 5% of the swept pore volume of layers(s) of the reservoir, to a higher dissolved additive concentration (compared with continuous injection of the same weight of additive using the same injected pore volume as for the alternating slugs, i.e. $PV_{continuous\ injection} = PV_{total\ of\ alternating\ slugs}$). This may be advantageous in releasing additional incremental oil from the portion of the layer(s) of reservoir rock closest to the injection well.

Modelling studies have also shown that injection of alternating slugs of aqueous displacement fluid and aqueous spacer fluid into at least one layer of reservoir rock having a dimensionless dispersivity in the range of 1 to 30%, has the effect of providing a similar profile for the maximum dissolved additive concentration in the dispersively mixed slugs of aqueous displacement fluid and of aqueous spacer fluid compared with continuous injection of the aqueous displacement fluid when: (i) the same total amount (weight or molar amount) of dissolved additive is injected into the layer(s) of reservoir rock; and (ii) the pore volume of the continuously injected aqueous displacement fluid ($PV_{continuous\ injection}$) is the same as the total pore volume of the slugs of aqueous displacement fluid and of the slugs of aqueous spacer fluid ($PV_{total\ of\ alternating\ slugs}$).

An advantage of injecting a plurality of slugs of aqueous displacement fluid separated by aqueous spacer slugs is that there is no requirement to have a storage tank for the aqueous displacement fluid at the injection site. Instead, a concentrate comprising a concentrated aqueous solution of the additive may be transported by tanker to the injection site of the reservoir and may be injected directly from the tanker into the injection system for the injection well (either with or without dilution into an injection water). This is particularly advantageous for an offshore reservoir as there may be space and weight limitations for an offshore platform or Floating Production and Offloading Facility (FPSO).

In an embodiment of the method of the present invention, the aqueous displacement fluid may be transported to the injection site of an offshore reservoir by a tanker ship and may be injected directly into the injection system for either a single injection well or for a plurality of injection wells, from the tanker ship. Suitably, the aqueous displacement fluid may be injected into a subsea injection system. The offloading tanker ship may be moored to a single-point mooring (SPM), i.e., a loading buoy anchored offshore, that serves both as a mooring point and as an interconnect for the tanker ship. Thus, the SPM is in fluid communication with both the injection system for the injection well(s) and the offloading tanker ship. Typically, the loading buoy is provided with mooring and anchoring elements, a rotating part, a swivel and a fluid transfer system. The swivel is the connection between geostatic and rotating parts of the loading buoy and enables the offloading tanker ship to rotate (weathervane) with respect to the loading buoy when the tanker ship is moored to the loading buoy by means of a hawser arrangement. Typically, the fluid transfer system of the loading buoy comprises a riser connected between the loading buoy and the subsea injection system and a floating hose string connected between the loading buoy and the offloading tanker ship. However, it is also envisaged that the method of the present invention may be used with an onshore reservoir where the concentrate is delivered to the injection site by tanker trucks.

Typically, the volumetric slug size for each of the individual slugs of aqueous displacement fluid is limited by the volumetric delivery capacity of the tanker (tanker ship or tanker truck) that delivers the concentrate to the injection site. The volumetric slug size is therefore limited by the tanker delivery volume (L) and a dilution factor wherein the dilution factor is the volumetric fraction of concentrate in the slug of aqueous displacement fluid. For avoidance of doubt, the tanker delivery volume is the volume of concentrate contained in the tanker prior to off-loading. Typically, the dilution factor is in the range of 0.1 to 1 (10 to 100% by volume of concentrate in the injected slug of aqueous displacement fluid), preferably, 0.2 to 1 (20 to 100% by volume of concentrate in the injected slug of aqueous displacement fluid). Thus, when the concentrate is injected into the injection well(s) without dilution into an injection water, the dilution factor is 1. The dilution factor will be dependent upon the concentration of additive in the concentrate (in weight/L or moles/L) and the target concentration of additive in the slugs of aqueous displacement fluid (in weight/L or moles/L) that are to be injected into the layer(s) of reservoir rock. Where the injection system is in fluid communication with a plurality of injection wells, the slug size for each individual injection well is also dependent upon the weight fraction (or mole fraction) of additive to be injected into the layer(s) of reservoir rock from each individual injection well.

The volumetric slug size for a single injection well may be determined as follows:

volumetric slug size=tanker delivery volume×dilution factor.

The volumetric slug size for an individual injection well of a plurality of injection wells may be determined as follows:

volumetric slug size=tanker delivery volume×dilution factor×weight fraction (or mole fraction) of additive injected into the individual injection well.

Where, equal weight fractions (or mole fractions) of additive are injected into a plurality of injection wells, n, the weight fraction (or mole fraction) is taken to be 1/n. However, it is also envisaged that different weight fractions (or mole fractions) of additive may be injected into each of the plurality of injection wells.

It is envisaged that, where the concentrate is diluted into an injection water, the initial concentration of additive (and hence the initial weight or initial moles of additive) in each of the plurality of slugs of aqueous displacement fluid may be the same or different. Different initial concentrations of additive may be achieved in the slugs by adjusting the dilution factor for the concentrate. Losses of dissolved additive to the reservoir (for example, through adsorption on the reservoir rock) may be higher at the front of the dispersively mixed fluids. Accordingly, the initial concentration of additive in the plurality of slugs may decrease with each successively injected slug in order to take into account losses of dissolved additive to the reservoir. Without wishing to be bound by any theory, it is believed that at least a portion of the adsorbed additive may desorb from the reservoir rock into the aqueous spacer slugs over the travel distance at which at least a portion of each spacer slug remains intact in the layer(s) of reservoir rock. It is also believed that at least a portion of the adsorbed additive may desorb from the reservoir rock into any subsequently injected aqueous drive fluid. The initial concentration of additive in the slugs of aqueous displacement fluid may be selected such that at least a portion of the dispersively mixed fluids has a dissolved additive concentration that remains above a target dissolved additive concentration at a set (or fixed) travel distance through the layer(s) of reservoir rock from the injection well. Suitably, the target concentration of dissolved additive at the set travel distance is at least the threshold concentration, $C_T$, for the additive, preferably, at least two times $C_T$, more preferably, at least 5 times $C_T$. Suitably, the set travel distance through the layer(s) of reservoir rock may be at least 25%, preferably, at least 50% of the interwell distance between the injection well and production well.

Modelling studies using a transportation mixing module of a geochemical model may be used to determine the optimal initial concentration of dissolved additive for different sized pore volume slugs of aqueous displacement fluid that achieves the desired target dissolved additive concentration in the dispersively mixed fluids at the set travel distance.

Typically, the target dissolved additive concentration in the dispersively mixed fluids at the set travel distance is dependent upon the initial concentration of additive in the plurality of slugs of aqueous displacement fluid, the pore volumes of each of the slugs of aqueous displacement fluid, the pore volumes of each of the spacer slugs, losses of dissolved additive to the reservoir and the reservoir dispersivity as a percentage or fraction of the set travel distance through the layer(s) of reservoir rock. The person skilled in the art will understand that as each slug of aqueous displacement fluid begins to dispersively mix with adjacent slugs of aqueous spacer fluid, the concentration profiles will evolve over time. For example, initially, the concentration profile for each individual dispersively mixing slug of aqueous displacement fluid may have a normal distribution such that the concentration is at a maximum in the middle of each slug and tapers symmetrically at the front and rear of the slugs or an asymmetric distribution such that the maximum concentration is skewed (i.e. is offset from the middle of the slug). An asymmetric concentration distribution may occur where the reservoir is heterogeneous i.e., there is a variation in physical properties of the reservoir rock (for example, porosity or permeability) with location within the reservoir. It is envisaged that, eventually, each of the slugs of aqueous displacement fluid may become completely mixed with the adjacent spacer slugs such that the slugs merge within the layer(s) of reservoir rock to form a single diluted slug of aqueous displacement fluid. If so, the target concentration refers to the concentration of the merged diluted slug at the selected travel distance.

Without wishing to be bound by any theory, it is believed that the dissolved additive in the dispersing slugs of aqueous displacement fluid releases additional components of the crude oil that would not otherwise be released from the pores of the reservoir rock by waterflooding the layer(s) of reservoir rock with the water used as the aqueous solvent for the aqueous displacement fluid or the water used as the aqueous spacer fluid. Accordingly, a "bank of released oil" is swept through the layer(s) of reservoir rock towards the production well. Thus, an advantage of the method of the present invention is that the dispersing slugs of aqueous displacement fluid and aqueous spacer fluid provide a similar concentration profile for the additive within the layer(s) of reservoir rock compared with continuously injecting the aqueous displacement fluid into the layer(s) of reservoir rock (when the same quantity of additive is injected into the layer(s) of reservoir rock in slugging mode and continuous injection mode and the total pore volume of the alternating slugs of aqueous displacement fluid and of aqueous spacer fluid is substantially the same as the pore volume of the continuously injected aqueous displacement fluid).

The alternating slugs of aqueous displacement fluid and of aqueous spacer fluid are preferably injected, under pressure, into at least one injection well that is spaced from a production well such that the aqueous displacement fluid passes into the at least one layer of reservoir rock. The passage of the dispersing slugs of aqueous displacement fluid through the layer(s) of the reservoir rock displaces oil from the rock surface and forces the displaced oil ahead of it, and towards the production well from which the oil is recovered. Preferably, the injection well and production well are spaced apart in a lateral direction i.e. are not overlying.

The swept pore volume (defined above) between an injection well and the associated production well(s) may be readily determined by methods known to the person skilled in the art. Thus, the swept pore volume may be determined by passing a high salinity water having an inert tracer contained therein through the layer(s) of reservoir rock from the injection well to the production well(s). The swept pore volume may also be determined using modeling studies. These modeling studies employ a reservoir simulator into which has been imported a static geological model of the reservoir. This static geological model is obtained by inputting seismic imaging data and petrophysical data (such as the porosity and permeability of the layer(s) of reservoir rock, mineralogical data, the initial water saturation of the reservoir, and the initial oil saturation of the reservoir) thereby generating a 3 dimensional (3-D) model of the reservoir showing the layers of the reservoir rock, traps and any faults and incorporating petrophysical data associated with one or more layers of the reservoir. The locations of the injection well(s) and production well(s) are subsequently inputted into the reservoir simulator together with additional fluid properties such as the relative permeabilities of the reservoir rock to oil and water. The reservoir simulator is then used to model injection of fluids into the one or more layers of reservoir rock via the injection well(s), movement of fluids through one or more layers of the reservoir, in particular, the oil-bearing layers, and production of fluids from the reservoir via the production well(s). The reservoir simulator model may also be updated using 4-dimensional (4-D) seismic imaging data i.e. seismic imaging data obtained at one or more points in time following commencement of oil production from the reservoir. The reservoir simulator may be used to determine the swept pore volume between an injection well and one or more production wells by modeling the movement of an injected fluid comprising a tracer from the injection well to the production well(s). The swept pore volume differs from a pore volume determined using the volume of the oil-bearing layer(s) between the injection well and production well(s) and the porosity of the reservoir rock as the swept pore volume takes into account barriers to flow such as a reduction in permeability of the layer(s) of reservoir rock.

As discussed above, there may be one injection well and one production well, but preferably there may be more than one injection well and more than one production well. The person skilled in the art will understand that depending on the spatial arrangement of the injection well and its associated production wells, the aqueous displacement fluid may break-through into each production well at different times.

The method of the invention may be used at commencement of oil production from the reservoir (omitting primary recovery), in secondary recovery mode (after primary recovery of oil under the natural pressure of the reservoir) or in tertiary recovery mode (for example, after a waterflood with a water that does not contain a dissolved additive, in particular, a dissolved EOR additive).

The person skilled in the art will understand that in secondary recovery mode, fluid is injected into the formation from an injection well in order to maintain the pressure in the formation and to sweep oil towards a production well. An advantage of injecting the alternating slugs of aqueous displacement fluid (containing a dissolved EOR additive) and the aqueous spacer fluid into the layer(s) of reservoir rock during secondary recovery is that the dissolved additive releases additional oil from the pores of the at least one layer of reservoir rock. Accordingly, there may be a longer period of dry oil recovery from the production well thereby deferring water breakthrough. In addition, even after water breakthrough, there may be enhanced recovery of oil compared with using the injection water used as the aqueous spacer fluid and potentially less water production. Also, there may be less water production (a higher oil to water ratio) for a given volume of produced fluid compared with using the injection water employed as the aqueous spacer fluid. These advantages also apply if the method of the present invention is used at commencement of oil production from a reservoir.

The person skilled in the art will understand that in tertiary recovery, injection of the original fluid is stopped and a different fluid is injected into the layer(s) of reservoir rock for enhanced oil recovery. Thus, the fluids injected into the layer(s) of reservoir rock during tertiary recovery are the alternating slugs of the aqueous displacement fluid and the aqueous spacer fluid, and the fluid that has previously been injected into the layer(s) of reservoir rock during secondary recovery may be a water that does not contain an additive, in particular, an EOR additive). Typically, the previously injected water may be seawater, estuarine water, brackish water, produced water, aquifer water, river water, lake water, desalinated water or a mixture thereof.

The present invention will now be illustrated by reference to the following Examples and Figures.

Example 1—Transportation Mixing Modelling

A transportation mixing module of a geochemical model was used to model mixing of alternating slugs of aqueous displacement fluid and of aqueous spacer slugs. The transportation mixing module was a single phase one dimensional transportation mixing module. The one dimensional transportation mixing module comprised a plurality of cells arranged in series through which fluids were shifted (displaced). The total number of cells in the series was taken to contain one pore volume of fluid. Accordingly, a fraction of the cells was taken to contain a fractional pore volume of fluid. When modelling injection of alternating slugs of aqueous displacement fluid and of aqueous spacer fluid, each of the cells of the series initially contained formation water and, for each shift, either aqueous displacement fluid or aqueous spacer fluid was introduced to the first cell in the series, fluids contained in the first and successive cells were shifted (displaced) to the next cell in the series, and fluids removed from the last cell in the series were disregarded. Thus, if there were a number of cells, n, introduction of one pore volume of fluids into the cells required n shifts. Typically, the number of cells, n, in the transportation mixing module was at least 10, preferably, 20 to 2000, for example, 50 to 1500. Mixing between the fluids contained in the cells was introduced as the fluids advanced through each cell of the series with the amount of mixing in each cell being determined from an inputted dispersivity value in the range of 1 to 30%, preferably, 2 to 25%, in particular, 2 to 10% (wherein the dispersivity was defined as a percentage of the number of cells of the transportation mixing module). Thus, mixing increased with both increasing dispersivity and with increasing number of shifts. The person skilled in the art will understand that as the fluids were shifted, the slugs of aqueous displacement fluid and the slugs of aqueous spacer fluid may become completely mixed in one of the cells of the series and consequently mixing of fluids may extend to other cells in the series. After the desired total fractional pore volume of aqueous displacement fluid was introduced to the series of cells, thereafter, for each shift, an aqueous drive fluid was introduced into the first cell in the series until the aqueous drive fluid had been shifted (displaced) through each of the cells in the series.

Modeling Results

A one dimensional reservoir mixing model (PHREEQC model) having 1000 cells (1000 L total pore volume) was used to simulate transportation of an additive through a reservoir in two different modes:

(1) Continuous injection of an aqueous solution of an additive into the cells; and (2) Alternating injection of slugs of an aqueous solution of the additive and aqueous spacer slugs into the cells.

Simulations were performed under the conditions of Table 1 with either continuous injection of 1.0 pore volumes of an aqueous solution of an additive or with injection of a total of 1.0 pore volumes of alternating slugs of aqueous displacement fluid and aqueous spacer fluid (each slug may occupy more than one cell). Simulations were also performed under the conditions of Table 2 with either continuous injection of 0.2 pore volumes of an aqueous displacement fluid followed by injection of 0.8 pore volumes of an aqueous drive fluid or with injection of a total of 0.2 pore volumes of alternating slugs of aqueous displacement fluid and aqueous spacer solution followed by 0.8 pore volumes of an aqueous drive fluid. Thus, for each simulation, a total of one pore volume of fluid(s) was introduced into the cells. Sodium was used as a generic additive for the aqueous displacement fluid. The same total quantity of additive (100 moles) and the same reservoir dispersivity of 1% were used in all simulations. Simulations were performed both with and without selecting a value for reservoir adsorption capacity in the model.

TABLE 1

PHREEQC simulations using one pore volume of continuously injected aqueous displacement fluid or one pore volume of alternating slugs of aqueous displacement fluid and aqueous spacer fluid

| Simulation | Number of Slugs of Aqueous Displacement Fluid | Ratio of Aqueous Spacer Slugs to Slugs of Aqueous Displacement Fluid | Dispersivity (%) | Reservoir Adsorption Capacity (mol/PV) |
|---|---|---|---|---|
| 1 (101) | Continuous Injection (1000) | Not applicable | 1.0 | 0 |
| 2 (202) | 20 | 1:1 | 1.0 | 0 |
| 3 (103) | 50 | 3:1 | 1.0 | 0 |
| 4 (111) | Continuous Injection (1000) | Not applicable | 1.0 | 50 |
| 5 (212) | 20 | 1:1 | 1.0 | 50 |
| 6 (113) | 50 | 3:1 | 1.0 | 50 |

TABLE 2

PHREEQC simulations - 0.2 pore volumes of continuously injected aqueous displacement fluid or of alternating slugs of aqueous displacement fluid and aqueous spacer fluid

| Simulation | Number of Slugs of Aqueous Displacement Fluid | Ratio of Aqueous Slugs to Slugs of Aqueous Displacement Fluid | Dispersivity (%) | Reservoir Adsorption Capacity (mol/PV) |
|---|---|---|---|---|
| 7 (104) | Continuous Injection (200) | 0 | 1.0 | 0 |
| 8 (106) | 50 | 3:1 | 1.0 | 0 |
| 9 (114) | Continuous Injection (200) | 0 | 1.0 | 50 |
| 10 (116) | 50 | 3:1 | 1.0 | 50 |

Figure 1B:
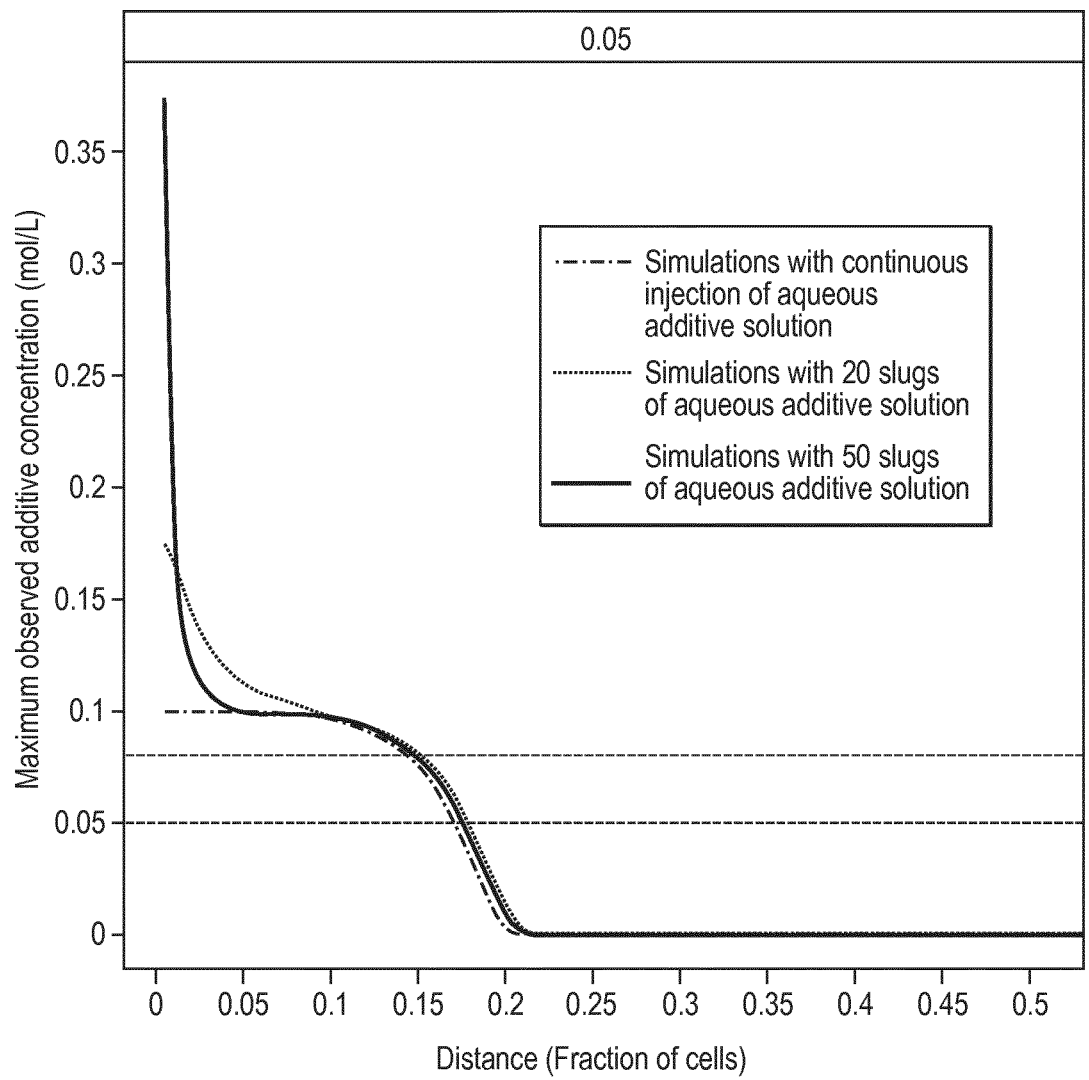
Figure 2A:
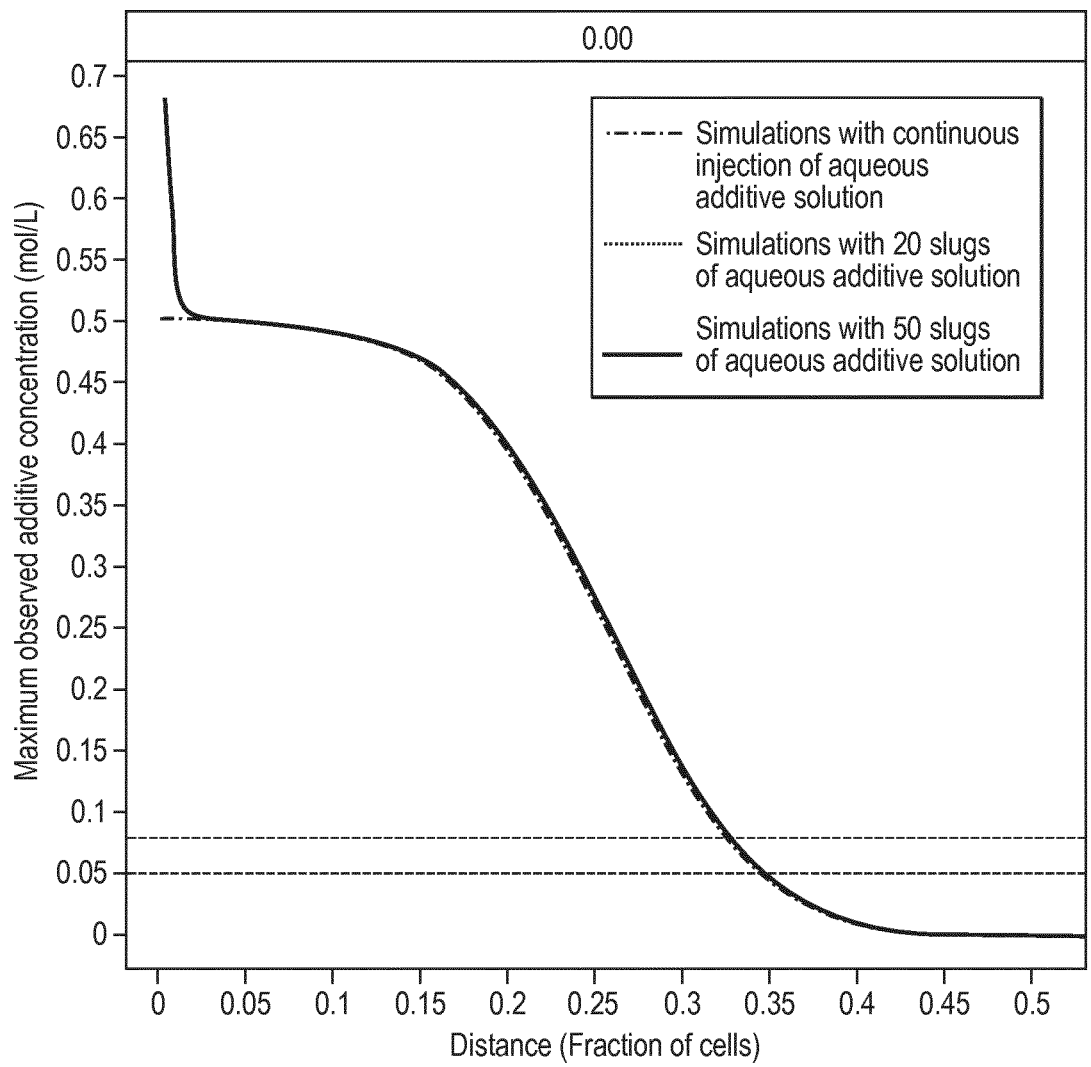
Figure 2B:
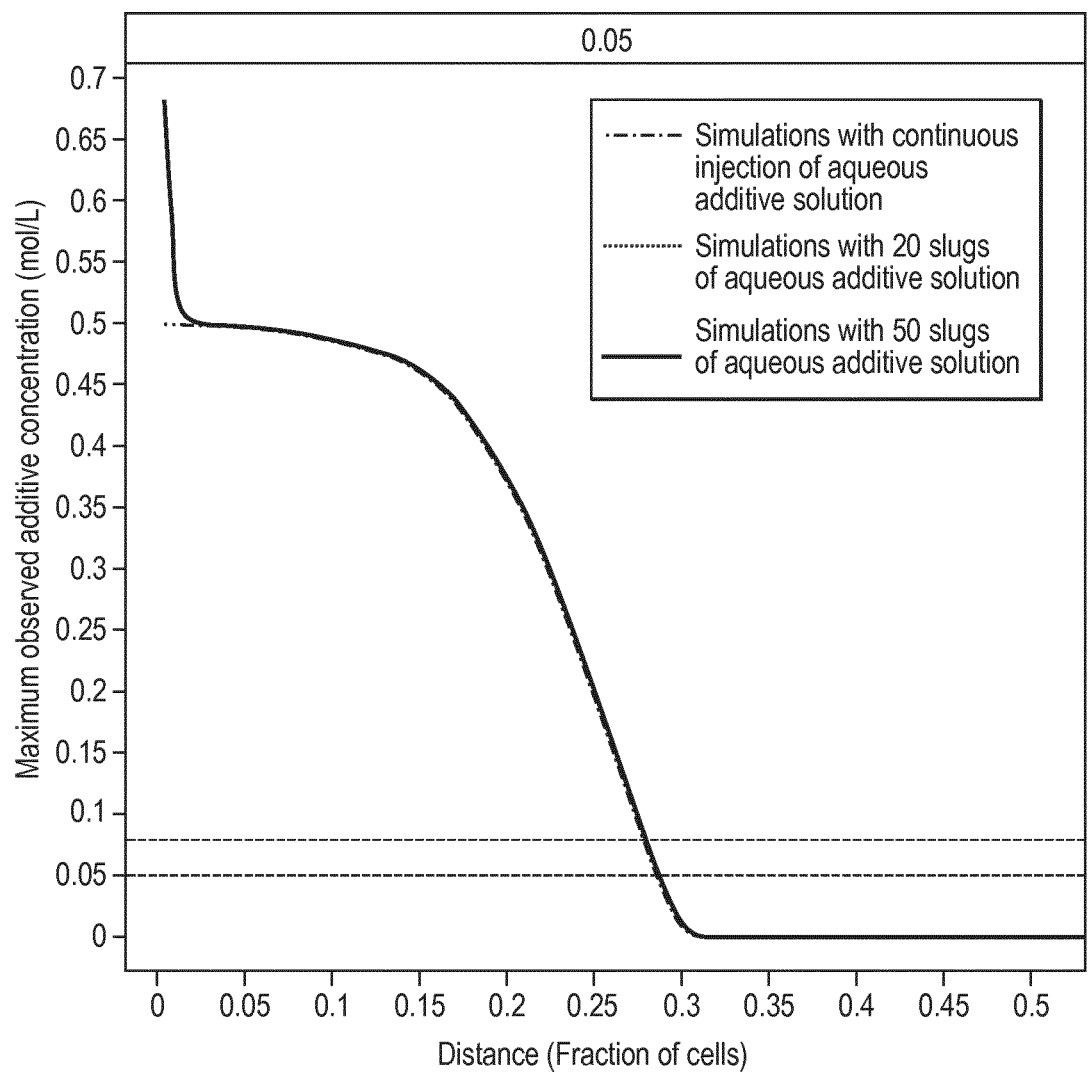

The profiles for the maximum additive concentrations after injection of 0.25 pore volumes of fluids for simulations performed under the conditions of Table 1 are shown in FIGS. 1a and 1b. Similarly, the profiles for the maximum additive concentrations after injection of 0.25 pore volumes of fluids for simulations performed under the conditions of Table 2 are shown in FIGS. 2a and 2b. FIGS. 1a and 2a are profiles obtained with adsorption of additive switched off in the model while FIGS. 1b and 2b are profiles obtained with adsorption of additive switched on in the model. FIGS. 1a and 1b show the profiles for simulations with continuous injection of an aqueous solution of additive (aqueous displacement fluid) and the profiles for simulations with injection of 20 and 50 slugs of aqueous displacement fluid separated by slugs of aqueous spacer fluid. FIGS. 2a and 2b show the profiles for simulations with continuous injection of an aqueous solution of additive (aqueous displacement fluid) and for simulations with injection of 50 slugs of aqueous displacement fluid separated by slugs of aqueous spacer fluid. As the same weight of additive was injected into the transportation mixing module for all simulations, the modelling of injection of alternating slugs necessitated an increase in the concentration of additive in the slugs of aqueous displacement fluid compared with modelling of continuous injection of the aqueous solution of additive. It can be seen that the simulations in which there is adsorption of additive results in a sharpening of the additive front in the model. Surprisingly, it was found that after injection of 0.25 pore volumes of fluids, the additive concentration profiles for continuous injection of aqueous displacement fluid are similar to those for injection of alternating slugs of aqueous displacement fluid and slugs of aqueous spacer fluid. However, there is a higher concentration of additive in the initial portion of the reservoir (initial 0.05 PV of the reservoir) compared with the simulations employing continuous injection of the aqueous displacement fluid.

The invention claimed is:

1. A method for recovering crude oil from a reservoir comprising at least one layer of reservoir rock having crude oil and a formation water within the pore space thereof wherein the layer(s) of reservoir rock is penetrated by at least one injection well and at least one production well, the method comprising:

injecting into the layer(s) of reservoir rock from the injection well, alternating slugs of an aqueous displacement fluid comprising a solution of a water-soluble additive in an aqueous solvent and of an aqueous spacer fluid characterized in that:

(a) the number of injected slugs of aqueous displacement fluid, n, is in the range of 15 to 1000 per swept pore volume, PVR, of the layer(s) of reservoir rock;

(b) the injected pore volume of each individual slug, $PV_{Slug-i}$, of aqueous displacement fluid is in the range of $10^{-12}$ to $10^{-2}$ of the swept pore volume, PVR, of the layer(s) of reservoir rock:

$$10^{-12} \leq PV_{Slug-i} \leq 10^{-2};$$

(c) the total injected pore volume of the slugs of aqueous displacement fluid is in the range of $10^{-8}$ to $10^{-1}$ of the swept pore volume, PVR, of the layer(s) of reservoir rock:

$$10^{-8} \leq \sum_{i=1}^{n} PV_{Slug-i} \leq 10^{-1}$$

(d) the injected pore volume of each individual slug of aqueous spacer fluid, $PV_{Spacer-i}$, is in the range of 0.0001 to 0.1000 of the swept pore volume, PVR, of the layer(s) of reservoir rock:

$$0.0001 \leq PV_{spacer-i} \leq 0.1000;$$

(e) the total injected pore volume of the slugs of aqueous spacer fluid is in the range of 0.9000000 to 0.9999999 of the swept pore volume, PVR, of the layer(s) of reservoir rock:

$$0.9000000 \leq \sum_{i=1}^{n} PV_{Spacer-i} \leq 0.9999999$$

(f) the reservoir rock has a dispersivity, $\alpha$, in the range of 1 to 30% of the interwell distance between the injection well and production well; and (g) the amount of additive delivered to the layer(s) of reservoir rock by the plurality of slugs of aqueous displacement fluid is equal to or greater than a predetermined minimum additive quantity (MAQ), wherein the MAQ delivered to the layer(s) of reservoir rock by injecting the plurality of slugs of aqeuous displacement fluid satisfies Equation 1 below:

$$MAQ \left[ C_{InjAvg} \cdot \left( 4\sqrt{\alpha} \, \text{erf}^{-1} \left\{ \frac{C_r}{C_{InjAvg}} \right\} \right) + RAC \right] \cdot PVR, \quad (1)$$

wherein RAC is the adsorption capacity of the reservoir, $C_T$ is the threshold concentration for the additive, $C_{InjAvg}$ is the initial average concentration of additive in the alternating slugs of aqueous displacement fluid and of aqueous spacer fluid, $\alpha$ is the dispersivity of the reservoir rock and PVR is the swept pore volume of the layer(s) of reservoir rock.

2. A method as claimed in claim 1 wherein $C_{InjAvg}$ is determined using Equation 2 below:

$$C_{InjAvg} = \frac{\sum_{i=1}^{n}(C_{Slug-i} \cdot PV_{Slug-i})}{\sum_{i=1}^{n}(PV_{Slug-i} + PV_{Spacer-i})} \quad (2)$$

wherein $C_{Slug-i}$ is an initial concentration of additive in an individual slug of aqueous displacement fluid.

3. A method as claimed in claim 1 wherein the water-soluble additive is selected from the group consisting of surfactants; urea and derivatives thereof; ethylenediamine tetraacetic acid (EDTA) and alkali metal salts thereof; alkali metal hydroxides; alkali metal carbonates; alkali metal orthosilicates; and, mixtures thereof.

4. A method as claimed in claim 1 wherein an aqueous drive fluid is injected into the layer(s) of reservoir rock after injecting the alternating slugs of aqueous displacement fluid and of aqueous spacer fluid.

5. A method as claimed in claim 1 wherein the ratio of the injected pore volume of an individual slug of aqueous spacer fluid to the injected pore volume of an adjacent slug of aqueous displacement fluid in the range of 2:1 to 1000:1.

6. A method as claimed in claim 1 wherein the aqueous displacement fluid is intermittently delivered to an injection site of the reservoir by a tanker and the aqueous displacement fluid is injected directly from the tanker to an injection system for the injection well(s).

7. A method as claimed in claim 6 wherein the tanker is a tanker ship and is moored to a loading buoy at the injection site wherein the loading buoy serves both as a mooring point and as an interconnect between the tanker ship and the injection system for the injection well(s) and the aqueous displacement fluid is injected directly from the tanker ship into the injection system for the injection well(s) via the loading buoy.

8. A method as claimed in claim 6 wherein the aqueous displacement fluid is delivered to the injection site by the tanker in the form of a concentrate having a concentration of additive of at least 5% by weight and less than the saturation concentration of the additive at the ambient conditions at the injection site and wherein prior to the tanker arriving at the injection site, an injection water is injected into an injection system for the injection well and when the tanker arrives at the injection site either:

(a) injection of the injection water into the injection system is interrupted and the concentrate is delivered from the tanker to the injection system for the injection well(s) such that the concentrate serves as a slug(s) of aqueous displacement fluid and, after the tanker has finished delivering the concentrate to the injection system, injection of the injection water into the injection system recommences such that the injection water serves as a slug(s) of aqueous spacer fluid; or (b) injection of the injection water into the injection system is continued and the concentrate is delivered from the tanker to a mixing point of the injection system where the concentrate is diluted into the injection water such that the diluted concentrate serves as a slug(s) of aqueous displacement fluid and, after the tanker has finished delivering the concentrate to the mixing point, injection of the injection water is continued such that the injection water serves as a slug(s) of aqueous spacer fluid.

9. A method as claimed in claim 8 wherein the injection water is selected from saline waters; naturally occurring low salinity waters; sulfate reduced saline waters having sulfate anion concentrations of less than 100 ppmv; and desalinated saline waters having a sulfate anion concentration of less than 100 ppmv.

10. A method as claimed in claim 8 wherein the tanker either:
(a) delivers a slug of aqueous displacement fluid to a single injection well and the volumetric size of the slug is determined as follows:

volumetric slug size=tanker delivery volume×volumetric dilution factor; or (b) delivers a slug of aqueous displacement fluid to each of a plurality of injection wells and the volumetric size of a slug delivered to an individual injection well of the plurality of injection wells is determined as follows:

volumetric slug size=tanker delivery volume×volumetric dilution factor×fraction of additive injected into the layer(s) of reservoir rock from the individual injection well.

11. A method as claimed in claim 10 wherein the volumetric dilution factor is in the range of 0.1 to 1.

12. A method as claimed in claim 10 wherein the additive is a surfactant and the injection water is selected from soft waters having a concentration of hardness cations of less than 150 ppmv.

13. A method as claimed in claim 1 wherein from 20 to 500 slugs of aqueous displacement fluid are injected into the layer(s) of reservoir rock per swept pore volume.

14. A method as claimed in claim 1 wherein the pore volume sizes of the plurality of slugs of aqueous displacement fluid and of the aqueous spacer fluid are the same or different.

* * * * *